United States Patent [19]
Manuel

[11] Patent Number: 6,036,257
[45] Date of Patent: Mar. 14, 2000

[54] ARTICULATING LOWER ROLLER ASSEMBLY FOR SLIDING VEHICLE DOOR

[75] Inventor: Mark Manuel, Shelby Township, Macomb County, Mich.

[73] Assignee: General Motors Corporation, Detroit, Mich.

[21] Appl. No.: 09/324,141

[22] Filed: Jun. 2, 1999

[51] Int. Cl.⁷ ........................................................ B60J 5/06
[52] U.S. Cl. ............................................. 296/155; 49/213
[58] Field of Search ................................. 296/155, 146.1, 296/146.12; 49/360, 362, 213, 426, 221, 214

[56] References Cited

U.S. PATENT DOCUMENTS 5,921,613   7/1999   Breunig et al. .......................... 296/155

FOREIGN PATENT DOCUMENTS 55-8952 (A)   7/1979   Japan .
2-60825 (A)   8/1988   Japan .

*Primary Examiner*—Dennis H. Pedder
*Assistant Examiner*—Mickki D. Murray
*Attorney, Agent, or Firm*—Kathryn A. Marra

[57] ABSTRACT

A vehicle has a side opening that is closed by a sliding door. The door has an articulating lower roller assembly at the front end that translates in a track adjacent the bottom of the side opening. The roller assembly is attached to the door by a slide mechanism that allows the door to open further after the roller assembly reaches the end of the track. The slide mechanism is controlled by a spring biased clutch pin that is retracted by a cam on the vehicle body to release the slide mechanism as the door travels to the open position.

7 Claims, 4 Drawing Sheets

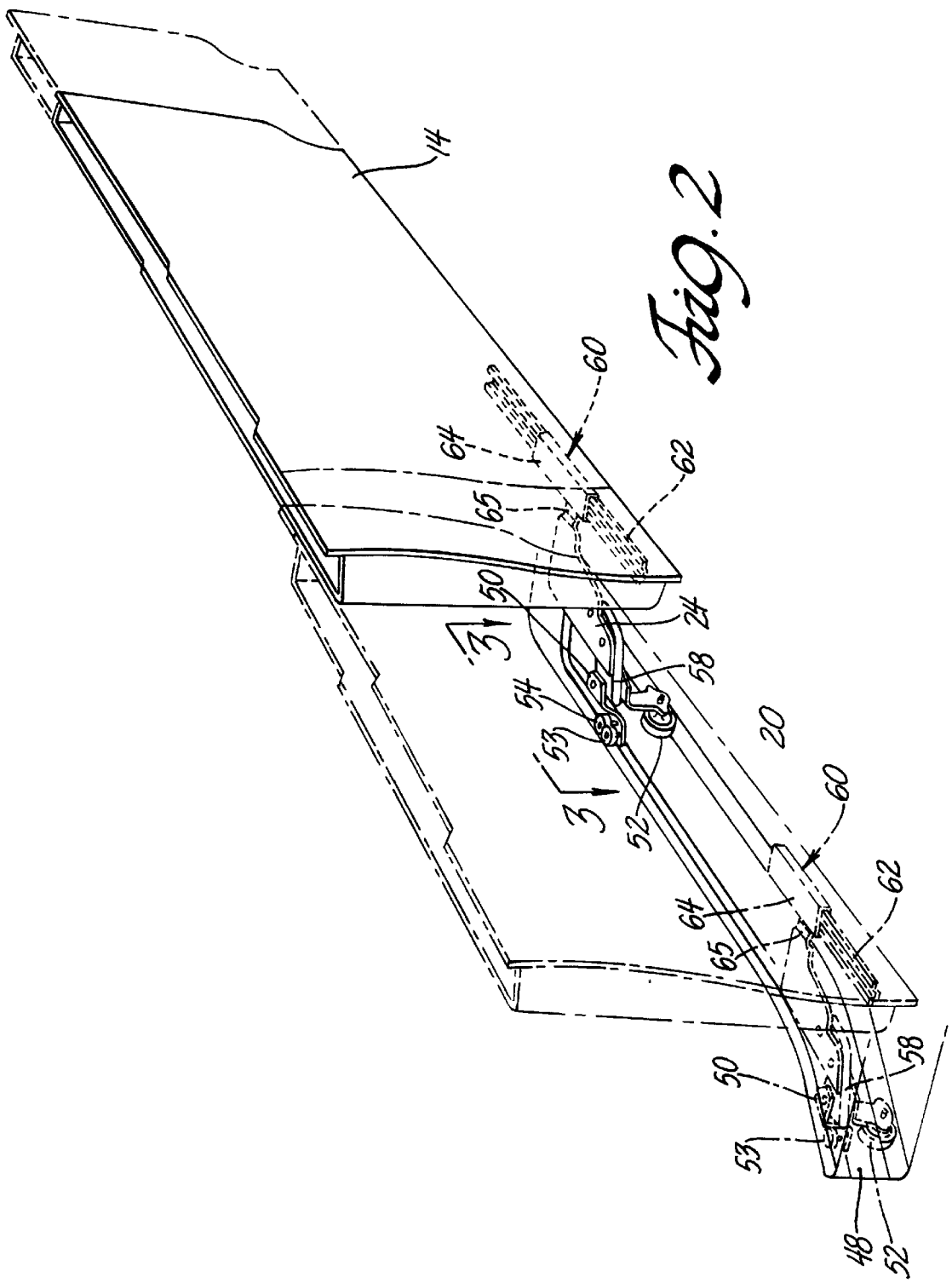

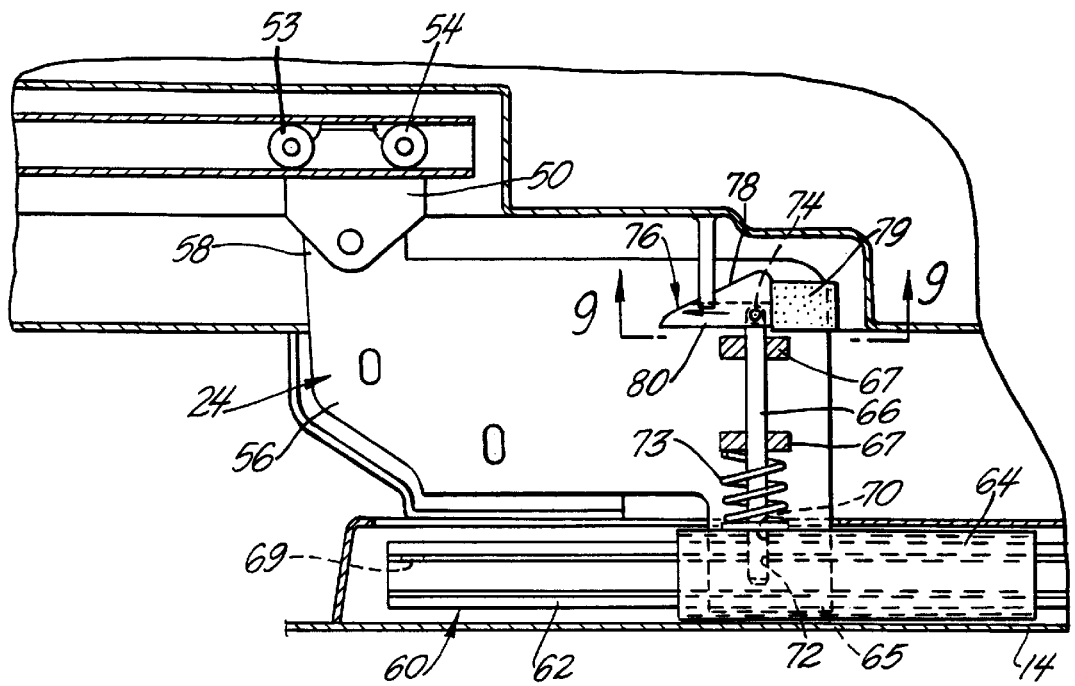
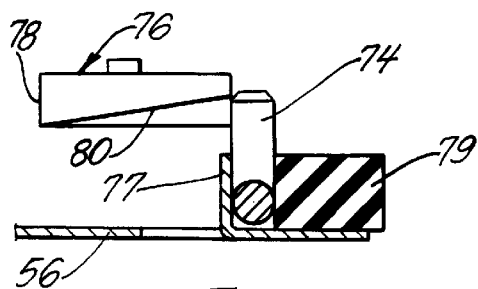
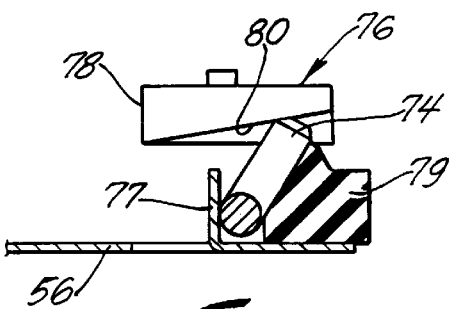
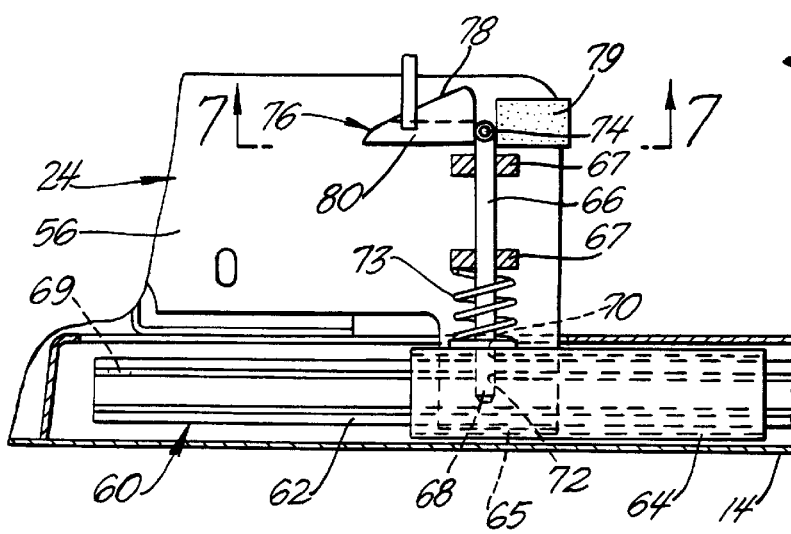

ARTICULATING LOWER ROLLER ASSEMBLY FOR SLIDING VEHICLE DOOR

TECHNICAL FIELD

This invention relates to a sliding vehicle door, such as is commonly used on a passenger van, and more particularly to an articulating lower roller assembly for such a sliding vehicle door.

BACKGROUND OF THE INVENTION

U.S. Pat. No. 5,316,365 granted to Howard W. Kuhiman and Jeffrey K. Joyner May 31, 1994 discloses a sliding vehicle door for a passenger van. The sliding door is supported and guided by an upper track, a center track and a lower track. An upper roller assembly is attached to an upper forward corner of the door and runs in the upper track which is at the top of the side door opening. A lower roller assembly is attached to the lower forward corner of the door and runs in the lower track which is at the bottom of the side door opening. A hinge and roller assembly is pivotally attached to the middle rear portion of the door and runs in the center track which is in the rear side panel of the van.

The travel of the sliding door from the closed position to the open position is limited by the length of the upper, middle and lower tracks. It is desirable to expose the entire side opening of the van when the sliding door is in the open position. This means that the front edge of the sliding door must be located at the rear edge of the side opening when the sliding door is in the open position and that the tracks must be long enough to accommodate door travel to such a position. This is generally not a problem in vans that have long wheel bases and a side opening of conventional size. However, it is difficult to fullly expose the side opening in vans that have a short wheel base or in vans that have a wide side opening. This difficulty is usually caused by the lower track which must terminate short of the body structure for the rear wheel well that is aft of the side opening.

SUMMARY OF THE INVENTION

The object of the invention is to provide an articulating lower roller assembly for a sliding vehicle door that permits the sliding vehicle door to travel past the end of the track so that a greater expanse of the side opening is exposed when the sliding door is opened.

A feature of the invention is that the articulating lower roller assembly moves with respect to the sliding vehicle door as well as the track.

Another feature of the invention is that the articulating lower roller assembly has a clutch that is automatically disengaged while the vehicle door is travelling to the open position to permit the door to move with respect to the roller assembly.

Another feature of the invention is that the articulating lower roller assembly has a clutch in the form of a translatable pin that is automatically retracted by the vehicle body while the door is travelling to the open position to release a slide mechanism in the door.

Yet another feature of the invention is that the translatable pin has an upright follower tab that is biased to the upright position by an elastomeric block that provides an optional bumper stop.

These and other objects, features and advantages of the invention will become more apparent from the following description of a preferred embodiment taken in conjunction with the accompanying drawing.

BRIEF DESCRIPTION OF THE DRAWINGS

The presently preferred embodiment of the invention is disclosed in the following description and in the accompanying drawings, wherein:

FIG. 2 is a partial perspective view of the passenger van of FIG. 1 showing the sliding side door in various positions;

FIG. 6 is a sectional view similar to FIG. 3 showing the sliding side door in an intermediate open position;

FIG. 7 is a section taken substantially along the line 7—7 of FIG. 6 looking in the direction of the arrows;

FIG. 8 is a view similar to FIG. 3 showing the sliding side door moving from the intermediate open position toward the closed position; and FIG. 9 is a section taken substantially along the line 9—9 of FIG. 8.

DETAILED DESCRIPTION OF THE PREFERRED EMBODIMENT

Figure 1:
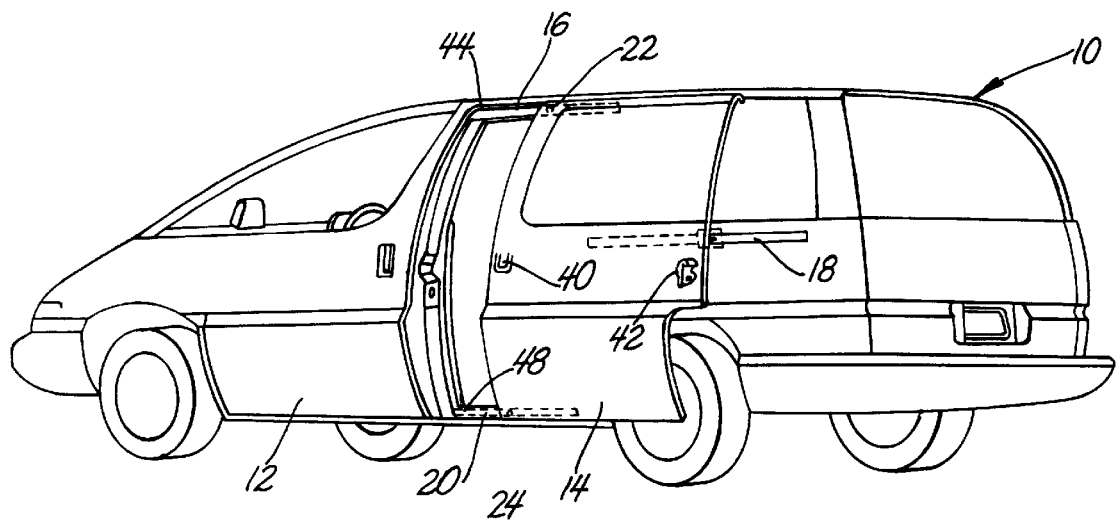
FIG. 1 is a schematic perspective view of a passenger van having a sliding side door that is shown partially open.

Vehicles such as passenger van 10 shown in FIG. 1 have a hinged front passenger door 12 and a rear side door 14. The rear side door 14 is commonly a sliding door mounted on rollers that run in tracks. The sliding door 14 historically is on the passenger side of the vehicle but in recent years vans with sliding doors on both sides of the vehicle have become popular. This is true of cargo or utility vans. Cargo or utility vans have the same body structure as the passenger vans but have interiors that are outfitted to carry cargo or for some other purpose.

The sliding side door 14 is supported and guided by an upper track 16, a center track 18 and a lower track 20. An upper roller assembly 22 is attached to an upper forward corner of side door 14 and runs in upper track 16 that is at the top of the side door opening. A lower roller assembly 24 is attached to the lower forward corner of side door 14 and runs in lower track 20 that is at the bottom of the side door opening. A hinge and roller assembly 26 is pivotally attached to the middle rear portion of side door 14 and runs in center track 18 that is in the rear side panel of the van.

The operation of a sliding door for a van type vehicle is well known and understood and need not be described in detail. Suffice it to say, that the sliding side door 14 moves horizontally from an intermediate open position shown in solid line in FIG. 2 toward the front of the van and horizontally inwardly to a closed position for closing and sealing the side opening. Latch 40 (FIG. 1) is provided at the front of the sliding door 14 to latch the door 14 in the closed position. Inward horizontal movement of sliding door 14 is achieved by curving the forward ends 44, 46 and 48 of tracks 16, 18 and 20 inward. On the other hand, sliding door 14 moves horizontally toward the back or aft end of the van to expose the side opening of the van. Latch 42 is provided at the aft end of the sliding door 14 to latch the sliding door 14 in the open position. In a conventional arrangement, vehicle door travel is limited by tracks 16, 18 and 20 and side door 14 is fullly open when the roller assemblies reach the aft end of the tracks 16, 18 and 20. This invention is directed to providing an articulating roller assembly 24 that allows the front edge of the door 14 to travel past the aft end of track 20 so that a greater expanse of the side door opening is exposed when the side door 14 is fullly open. The fully open position is shown in phantom to the right of the solid line position in FIG. 2.

Referring now to FIGS. 2–9, articulating lower roller assembly 24 comprises a carriage 50 that carries a support roller 52 for rotation about a horizontal axis and two guide rollers 53 and 54 for rotation about two spaced vertical axes. Support roller 52 supports the majority of the weight of sliding door 14 while guide rollers 53 and 54 engage track 20 to guide sliding door 14 as it moves back and forth between an intermediate open position (FIGS. 2 and 6) and a closed position (FIG. 4) as described below.

Roller assembly 24 flrter includes a support arm 56 that is pivotally connected to carriage 50 at an inboard end 58.

A slide mechanism 60 is attached to a forward lower corner of sliding door 14. Slide mechanism 60 includes a tramway 62 that is secured to the structure of sliding door 14 in a fixed manner, and a tram 64 that slides on tramway 62. Tram 64 is attached to an outboard end 65 of support arm 56 that is spaced from the inboard end 58 in the longitudinal direction of the passenger van by a significant distance.

Figure 3:
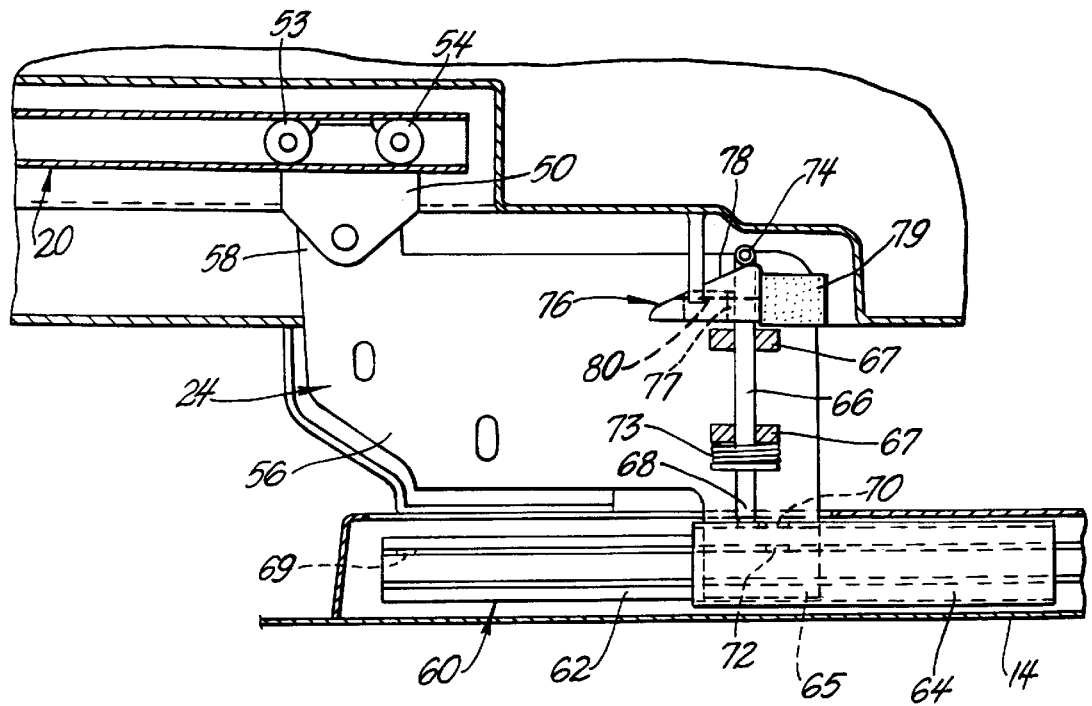
FIG. 3 is a sectional view taken substantially along the line 3—3 of FIG. 2 showing the sliding side door approaching an intermediate open position.
Figure 4:
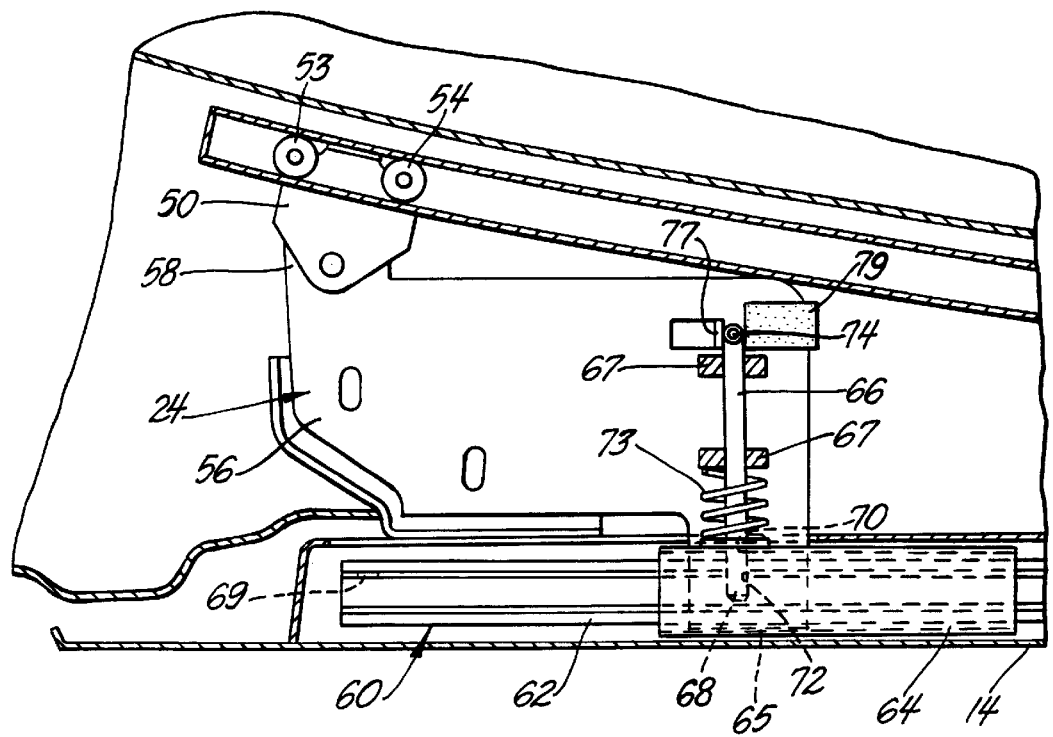
FIG. 4 is a sectional view similar to FIG. 3 showing the sliding side door in a closed position.
Figure 5:
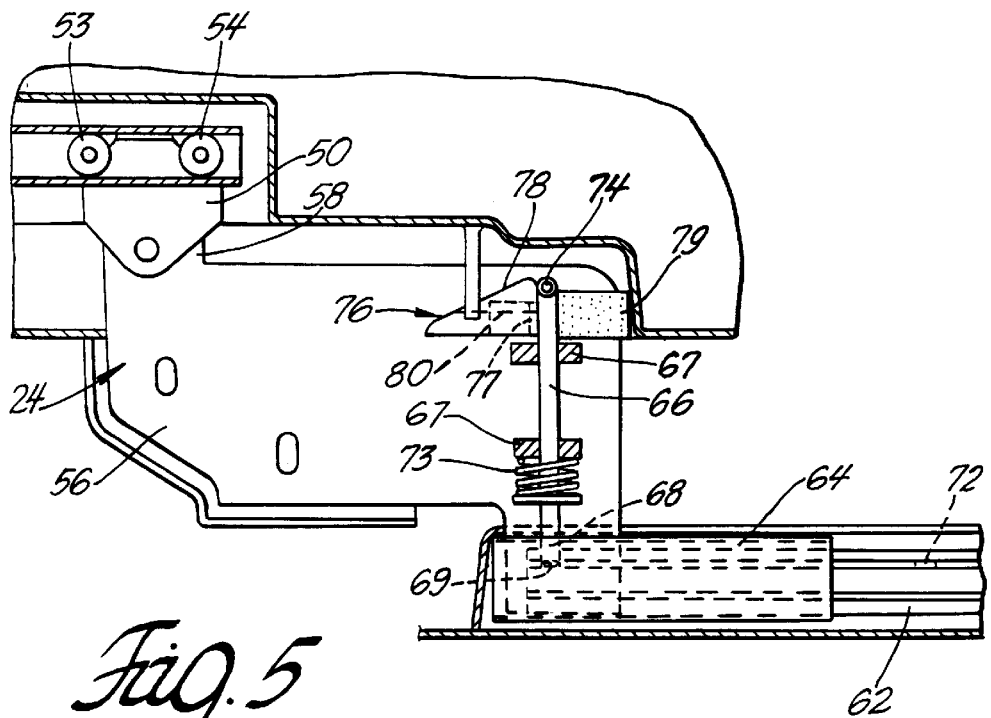
FIG. 5 is a sectional view similar to FIG. 3 showing the sliding side door in a fullly open position.

Roller assembly 24 also includes a clutch pin 66 (FIGS. 3–9) that is attached to support arm 56 by bearings 67 for turning movement and for sliding movement in a lateral direction between an engaged position shown in FIGS. 4, 6 and 8 and a disengaged position shown in FIGS. 3 and 5. Clutch pin 66 has a tip 68 that protrudes through a hole 70 in tram 64 and an aligned hole 72 in tramway 62 when clutch pin 66 is in the extended engaged position shown in FIGS. 4, 6 and 8. When engaged, clutch pin 66 holds tram 64 in a rearward position on tramway 62 as shown in FIGS. 4, 6 and 8.

Clutch pin 66 is disengaged by retracting clutch pin 66 enough for tip 68 to withdraw from hole 72 thereby releasing tram 64 for movement relative to tramway 62 from the rearward position shown in FIGS. 4 and 6 to a forward position shown in FIG. 5. Thus when clutch pin 66 is disengaged, sliding side door 14 is free to slide rearward an additional amount to a fully open position shown in FIG. 5 by tramway 64 moving to the forward position shown in FIG. 5. Latch 42 is engaged when door 14 reaches the fully open position to hold door 14 in the fullly open position.

The upper end of clutch pin 66 is bent upright to provide a cam follower tab 74 that cooperates with a cam 76 that is attached to the vehicle body. Tab 74 is disposed between an upright tongue 77 of support arm 56 and a rubber block 79 that is affixed to support arm 56. The lower end of clutch pin 66 is surrounded by a coil spring 73 that engages a plate attached to clutch pin 66 to bias clutch pin 66 outward to the extended position shown in FIGS. 4, 6 and 8. Cam 76 has an inner ramp 78 that translates clutch pin 66 and an outer ramp 80 that rotates clutch pin 66 via cam follower tab 74.

Sliding side door 14 operates as follows. Assuming side door 14 is latched in the closed position shown in FIG. 4, door 14 is opened by releasing latch 40 either by a conventional inside or outside latch operating handle (not shown) and then sliding side door 14 rearward to the fully open position shown in FIG. 5. As side door 14 slides rearward, roller assembly 24 initially translates in track 20 until roller assembly 24 reaches the rearward end of track 20 corresponding to the intermediate open position of door 14 shown in FIG. 2. As door 14 and roller assembly 24 approach the intermediate open position shown in FIG. 2 cam follower tab 74 of clutch pin 66 engages an inner ramp 78 on the edge of cam 76 retracting clutch pin 66 as shown in FIG. 3. This releases tram 64 to move relative to tramway 62. Roller assembly 24 continues to move rearwardly under its own momentum while tramway 62 simultaneously moves rearwardly with side door 14. Roller assembly 24 carries clutch pin 66 a short distance and then stops against the vehicle body. This moves cam follower tab 74 over the edge of cam 76 whereupon clutch pin 66 is biased outwardly by spring 73 against tramway 62. Clutch pin 66, however, does not extend fully because hole 72 has moved past tip 68. Tramway 62 continues to move rearwardly with side door 14 to the forward position shown in FIG. 5 where tip 68 engages detent 69 holding side door 14 in the fully open position. This process provides a smooth transition between the operation of roller assembly 24 and slide mechanism 60 so that side door 14 is opened in one continuous motion.

Side door 14 is closed by reversing the process. That is, side door 14 is closed by pushing side door 14 forward to overpower spring 73 and release tip 68 from detent 69 and then sliding side door 14 forward to the closed position in one continuous motion. As side door 14 slides forward, tramway 62 initially moves forwardly with respect to tram 64 from the position shown in FIG. 5 until tram 64 reaches the rearward position shown in FIGS. 6 and 7 whereupon tip 68 of clutch pin 66 engages with hole 72 of tram 62 under the action of spring 73. This fixes tramway 64 with respect to tram 62 and roller assembly 24 with respect to side door 14. Roller assembly 24 then moves forward on track 20 as side door 14 slides from the intermediate open position shown in FIGS. 2 and 6 to the closed position shown in FIG. 4 where side door 14 is latched in the closed position by latch 40.

Cam follower tab 74 is disposed between a metal tab 77 of support arm 56 and an elastomeric block 79 that is secured to support arm 56 by an adhesive or the like as shown in FIG. 7.

When roller assembly 24 moves forward on track 20, cam follower tab 74 initially engages a lower ramp 80 on the undersurface of cam 76 and pivots rearward while cam follower tab passes beneath cam 76 as shown in FIGS. 8 and 9. After cam follower tab 74 is past cam 76, cam follower tab 74 pivots upright against metal tab 77 under the bias of elastomeric block 79. Thus cam follower tab 74 is upright when side door 14 is closed as shown in FIG. 4 and in position to engage ramp 78 of cam 76 when the side door 14 is opened as shown in FIG. 3.

Elastomeric block 79 preferably overhangs support 56 so that elastomeric block 79 also acts as a bumper stop when side door 14 is fully opened as shown in FIG. 5.

As indicated above tip 68 is released from detent 69 by overpowering spring 73 to initiate door closure. Alternatively, tip 68 can be released by attaching a cable pin 66 that is operated by the inside or outside door handle. Another alternative is to release pin 66 electrically for instance by attaching pin 66 to a solenoid. In other words, many modifications and variations of the present invention in light of the above teachings may be made. It is, therefore, to be understood that, within the scope of the appended claims, the invention may be practiced otherwise than as specifically described.

I claim:

1. An articulating lower roller assembly for a sliding side door of a vehicle having a side opening and a lower track adjacent the bottom of the side opening comprising:

a carriage having a plurality of rollers for engaging the lower track of the vehicle so that the carriage translates on the track, a support arm pivotally connected to the carriage, a slide mechanism attached to a forward lower corner of the sliding door of the vehicle, the slide mechanism having a tramway that is fixed to the sliding door and a tram that is slidably mounted on the tramway, the tram being attached to the support arm, and a clutch member that is moveably mounted on the support arm for movement between an engaged position and a disengaged position, the clutch member fixing the tram with respect to the tramway in the engaged position and releasing the tram for movement with respect to the tramway in the disengaged position.

2. The articulating lower roller assembly as defined in claim 1 wherein the clutch member is disengaged by an operator affixed to the vehicle.

3. The articulating lower roller assembly as defined in claim 1 wherein the clutch member is a pin that is engaged by a spring and disengaged by a cam that is affixed to the vehicle.

4. The articulating lower roller assembly as defined in claim 3 wherein the pin translates with respect to support arm and includes an upright follower tab that is engaged by the cam.

5. The articulating lower roller assembly as defined in claim 4 wherein the follower tab engages an edge ramp of the cam to move the pin to the disengaged position.

6. The articulating lower roller assembly as defined in claim 5 wherein the follower tab is disposed between an upright wall of the support arm and an elastomeric block secured to the support arm.

7. The articulating lower roller assembly as defined in claim 6 wherein the elastomeric block overhangs the support arm to provide a bumper stop for the articulating lower roller assembly.

* * * * *